(12) United States Patent
Rak (10) Patent No.: US 11,560,807 B2
(45) Date of Patent: Jan. 24, 2023

(54) INTERNAL RETAINING RING FOR A ROTATING ASSEMBLY IN A GAS TURBINE ENGINE

(71) Applicant: PRATT & WHITNEY CANADA CORP., Longueuil (CA)

(72) Inventor: Pawel Rak, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/243,782

(22) Filed: Apr. 29, 2021

(65) Prior Publication Data
US 2022/0349313 A1  Nov. 3, 2022

(51) Int. Cl.
*F01D 11/00* (2006.01)
*F16B 21/18* (2006.01)

(52) U.S. Cl.
CPC .......... *F01D 11/003* (2013.01); *F16B 21/183* (2013.01); *F05D 2230/64* (2013.01); *F05D 2240/55* (2013.01); *F05D 2250/182* (2013.01); *F05D 2250/36* (2013.01); *F05D 2260/38* (2013.01)

(58) Field of Classification Search
CPC ..... F16B 21/183; F01D 11/003; F01D 11/005
See application file for complete search history.

(56) References Cited

U.S. PATENT DOCUMENTS

| | | | | |
|---|---|---|---|---|
| 551,913 | A | * 12/1895 | Sweet | ........................ F16J 9/00 277/495 |
| 2,426,219 | A | 8/1947 | Jackson | |
| 2,491,310 | A | * 12/1949 | Heimann | .............. F16B 21/186 411/518 |
| 2,813,732 | A | 11/1957 | Hird | |

(Continued)

FOREIGN PATENT DOCUMENTS

| | | |
|---|---|---|
| AT | 179450 | 8/1954 |
| GB | 702932 | 1/1954 |

(Continued)

OTHER PUBLICATIONS

European Search Report issued on counterpart EP application 22170127.9 dated Sep. 15, 2022.

*Primary Examiner* — Topaz L. Elliott
(74) *Attorney, Agent, or Firm* — Norton Rose Fulbright Canada LLP (57) ABSTRACT

An internal retaining ring for placement in a bore of an outer component of a rotating assembly comprises a semi-annular body having an outer circumferential surface with a curvature defined about a first center of curvature and radially outward protruding anti-rotation tabs operable for engagement with a corresponding anti-rotation feature of the outer component. An inner circumferential surface of the semi-annular body has radially inward protruding tabs circumferentially spaced apart around the inner circumferential surface. The radially inward protruding tabs have radially inner surfaces concentric with the outer circumferential surface, (Continued)

and recessed portions between the radially inward protruding tabs and having curvatures defined about a second center of curvature, the second center of curvature different from the first center of curvature.

20 Claims, 6 Drawing Sheets

(56) References Cited

U.S. PATENT DOCUMENTS

| | | | | |
|---|---|---|---|---|
| 2,883,899 | A * | 4/1959 | Bluth | F16B 21/18 411/518 |
| 2,886,382 | A * | 5/1959 | Mikas | F16B 21/18 384/537 |
| 3,326,580 | A | 6/1967 | Munier et al. | |
| 3,844,323 | A | 10/1974 | Anderson, Jr. | |
| 3,987,697 | A * | 10/1976 | Wurzel | F16B 21/186 411/353 |
| 4,183,280 | A * | 1/1980 | Hashimoto | F16B 21/186 403/DIG. 7 |
| 5,383,938 | A | 1/1995 | Rohr et al. | |
| 6,065,920 | A * | 5/2000 | Becker | F16B 21/18 411/521 |
| 7,500,697 | B2 * | 3/2009 | Romack | F16B 3/00 285/305 |
| 7,661,928 | B2 | 2/2010 | Bart et al. | |
| 7,931,001 | B2 * | 4/2011 | Bugescu | F01L 1/2405 123/90.55 |
| 3,020,324 | A1 | 9/2011 | Moser et al. | |
| 8,020,324 | B2 * | 9/2011 | Moser | E02F 3/3686 37/468 |
| 9,121,429 | B2 | 9/2015 | Hartman et al. | |
| 10,718,368 | B2 | 7/2020 | Rode | |
| 2007/0176412 | A1 * | 8/2007 | Romack | F16B 3/00 285/39 |
| 2008/0092414 | A1 * | 4/2008 | Moser | E02F 3/3686 37/468 |
| 2020/0011332 | A1 * | 1/2020 | Hill | F04D 29/044 |
| 2021/0062851 | A1 * | 3/2021 | Garcia | F16B 21/186 |

FOREIGN PATENT DOCUMENTS

| | | | |
|---|---|---|---|
| GB | 847874 A * | 4/1959 | |
| GB | 1441467 A | 6/1976 | |
| WO | WO2015/117997 A1 | 8/2015 | |
| WO | WO-2015117994 A1 * | 8/2015 | F16B 21/183 |

* cited by examiner

FIG-4

INTERNAL RETAINING RING FOR A ROTATING ASSEMBLY IN A GAS TURBINE ENGINE

TECHNICAL FIELD

The disclosure relates generally to retaining rings and, more particularly, to internal retaining rings suitable for rotating assemblies in a gas turbine engine.

BACKGROUND

Retaining rings are fasteners that may be used in gas turbine engines that are installed onto shafts or other rotating assemblies. Internal retaining rings are installed within the bore of a component whereas external retaining rings are installed on an outer surface of a component, typically within a groove. Internal retaining rings may be used to axially retain a component within the bore, for instance a sealing ring.

Internal retaining rings typically rely on internal spring-back forces to prevent their rotation once installed within a bore of a rotating part, for instance to prevent scoring. Such spring-back forces may render the installation of the retaining ring difficult, for instance due to the required stiffness to attain such spring-back forces. In addition, such spring-back forces would produce undesirable excessive radial loads on the retained components, which may lead to unacceptable stress concentrations that could reduce the component's lifespan. In other cases, an internal retaining ring must be installed between two components, for instance between two concentric shafts, where spacing is limited.

SUMMARY

In one aspect, there is provided an internal retaining ring for placement in a bore of an outer component of a rotating assembly, comprising: a semi-annular body; an outer circumferential surface of the semi-annular body, the outer circumferential surface having a curvature defined about a first center of curvature and radially outward protruding anti-rotation tabs operable for engagement with a corresponding anti-rotation feature of the outer component; and an inner circumferential surface of the semi-annular body, the inner circumferential surface including radially inward protruding tabs circumferentially spaced apart around the inner circumferential surface, the radially inward protruding tabs having radially inner surfaces concentric with the outer circumferential surface, and recessed portions between the radially inward protruding tabs and having curvatures defined about a second center of curvature, the second center of curvature different from the first center of curvature.

In accordance with another aspect, there is provided a rotation assembly operable for rotation along a rotation axis of a gas turbine engine, comprising: an outer component having a bore, a groove proximate an axial end of the outer component, and an anti-rotation feature proximate the groove; an inner component rotatably engaged with the outer component; a retained feature disposed within the bore of the outer component; and an internal retaining ring disposed in the groove and axially retaining the retained feature, the internal retaining ring including: a semi-annular body; an outer circumferential surface of the semi-annular body, the outer circumferential surface having a curvature defined about a first center of curvature and radially outward protruding anti-rotation tabs operable for engagement with the anti-rotation feature; and an inner circumferential surface of the semi-annular body, the inner circumferential surface including radially inward protruding tabs circumferentially spaced apart around the inner circumferential surface, the radially inward protruding tabs having radially inner surfaces concentric with the outer circumferential surface, and recessed portions between the radially inward protruding tabs and having curvatures defined about a second center of curvature, the second center of curvature different from the first center of curvature, the radially inward protruding tabs axially retaining the retained feature.

In a further aspect, there is provided a method for installing an internal retaining ring in a bore of an outer component of a rotating assembly, comprising: placing the internal retaining ring over an inner component of the rotating assembly, the inner component at least partially disposed within the outer component; positioning the internal retaining ring adjacent a groove in the bore of the outer component adjacent an axial end of the outer component; positioning the internal retaining ring in a groove in the bore of the outer component; engaging a pair of radially-outward protruding anti-rotation tabs at respective end portions of the internal retaining ring with corresponding anti-rotation features in the outer component.

BRIEF DESCRIPTION OF THE DRAWINGS

Reference is now made to the accompanying figures in which.

DETAILED DESCRIPTION

Figure 1:
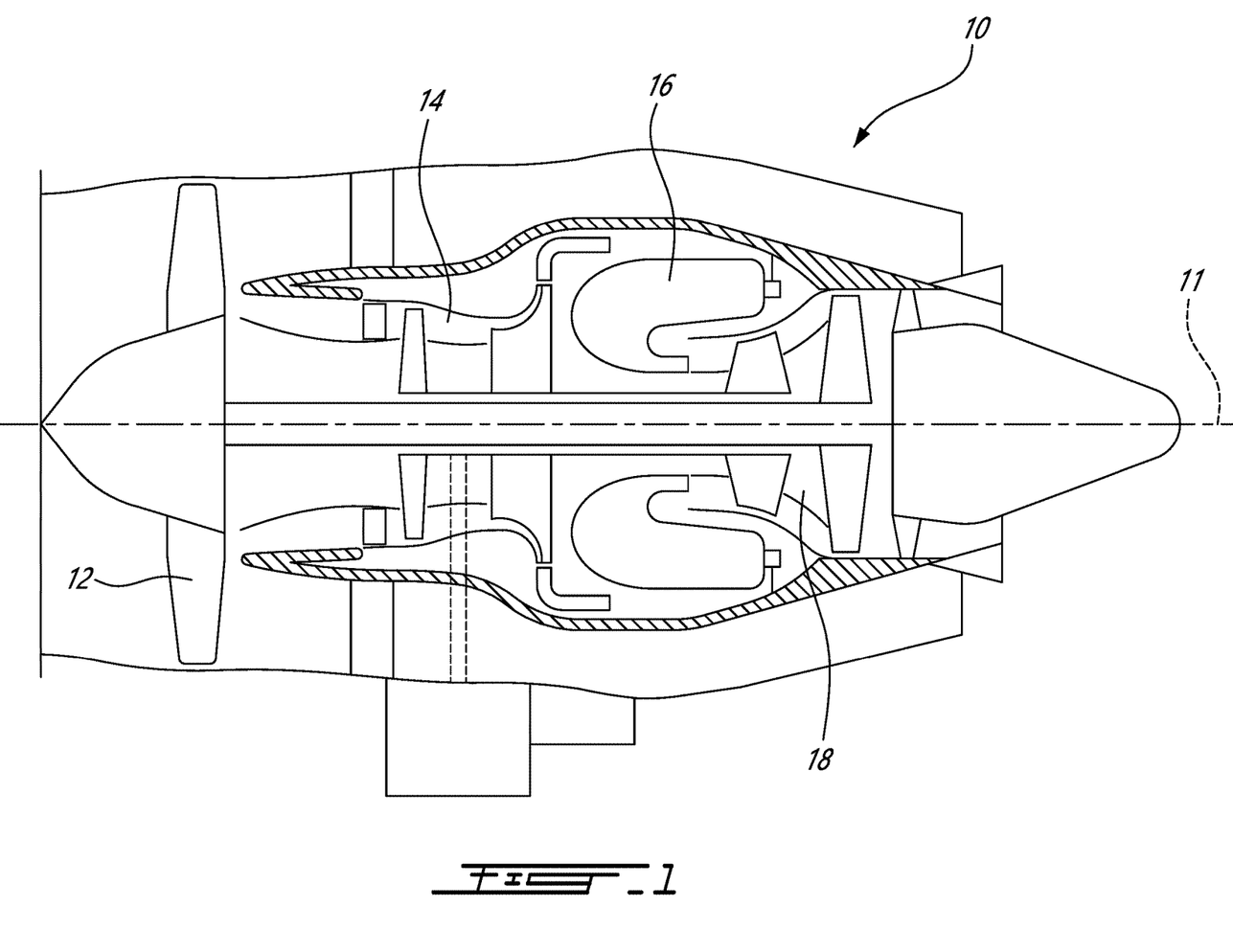
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although FIG. 1 shows a turbofan-type engine, the present disclosure is also applicable to other types of engines and mechanical assemblies.

Figure 2:
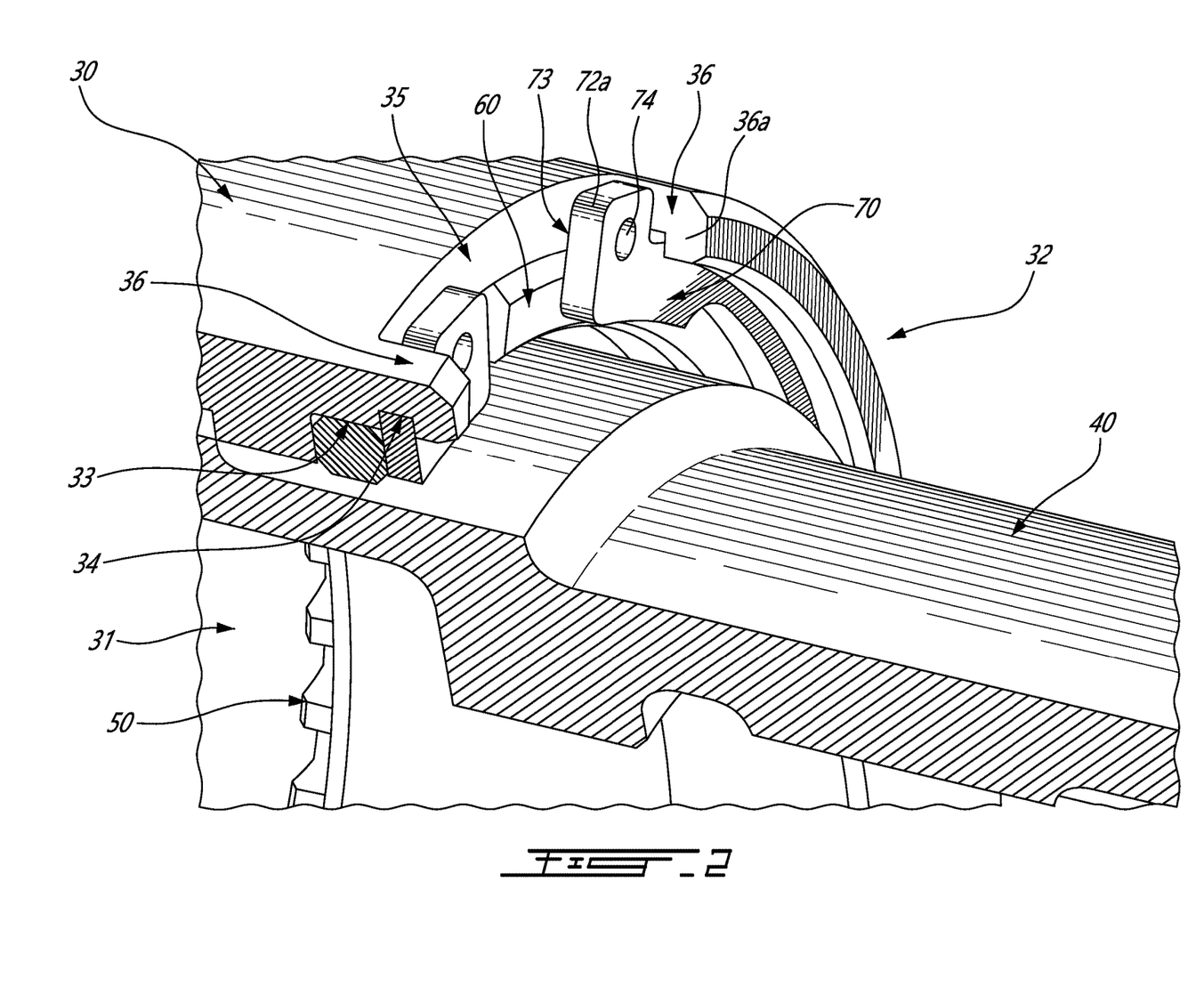
FIG. 2 is an isometric, cross-sectional view of a portion of a rotating assembly for the gas turbine engine of FIG. 1.

Referring to FIG. 2, an exemplary rotating assembly 20 for the gas turbine engine 10 is shown. The rotating assembly 20 includes an outer rotating component 30 rotatably engaged with an inner rotating component 40. Illustratively, the outer rotating component 30 is an outer shaft 30 and the inner rotating component 40 is an inner shaft 40, each operable for rotation about a central axis 11 of the gas turbine engine 10 (FIG. 1). The rotating assembly 20 may be one of various rotating assemblies within the gas turbine engine 10, for instance for interconnecting two gearboxes (not shown). In the shown case, the rotating assembly 20 includes a spline feature 50. Other types of rotating assemblies may be contemplated as well, for instance where only one of the outer component 30 and the inner component 40 rotates while the other may be stationary.

In the depicted embodiment, the outer shaft 30 includes a bore 31 in which the inner shaft 40 is inserted. The outer shaft 30 includes first 32 and second (not shown) axial ends along the central axis 11. The depicted outer shaft 30 includes a first groove 33 towards the first axial end 32 for placement of a retained feature or part 60. In the depicted embodiment, the retained feature 60 is a sealing ring 60 for sealing the rotating assembly 20, for instance to prevent engine oil from escaping, although other retained features or parts 60 may be contemplated as well. The first groove 33 is open towards the first axial end 32 of the outer shaft 30, for instance for ease of installation of the retained feature 60. As such, retaining means for the retained feature 60 may be required. The first groove 33 is also open at a radially inner side relative to the central axis 11.

The outer shaft 30 includes a second groove 34 at the first axial end 32 adjacent to the first groove 33. As depicted in FIG. 2, the second groove 34 is axially positioned between the first groove 33 and the first axial end 32. The second groove 34 is open at a radially inner end of the second groove 34 relative to the central axis 11 and closed at the three other ends of the second groove 34 (i.e. the two axial ends of the second groove and the radially outer end). As such, an internal retaining ring 70 may be placed in the second groove 34 to axially retain the retained feature 60, as will be discussed in further detail below. In other cases, the retained feature 60 may be otherwise seated or positioned within the bore 31 and the second groove 34 may be the only groove proximate the first axial end 32. For instance, the retained feature 60 may be retained by other physical means such as internal tabs (not shown).

A slot or window 35 may be provided in the first axial end 32 of the outer shaft 30, for instance for ease of installation of the internal retaining ring 70, for visual inspection of the installed internal retaining ring 70, and for any required adjustments. The outer shaft 30 further includes anti-rotation features 36, illustratively notches 36, at the circumferential extremities of the second groove 34 (i.e. where the second groove 34 meets the slot 35) for engagement with the internal retaining ring 70, as will be discussed in further detail below. In the shown case, the slot 35 extends axially inward towards the second groove 34. The notches 36 are thus formed at respective edges of the slot 35 proximate the second groove 34.

Figure 3:
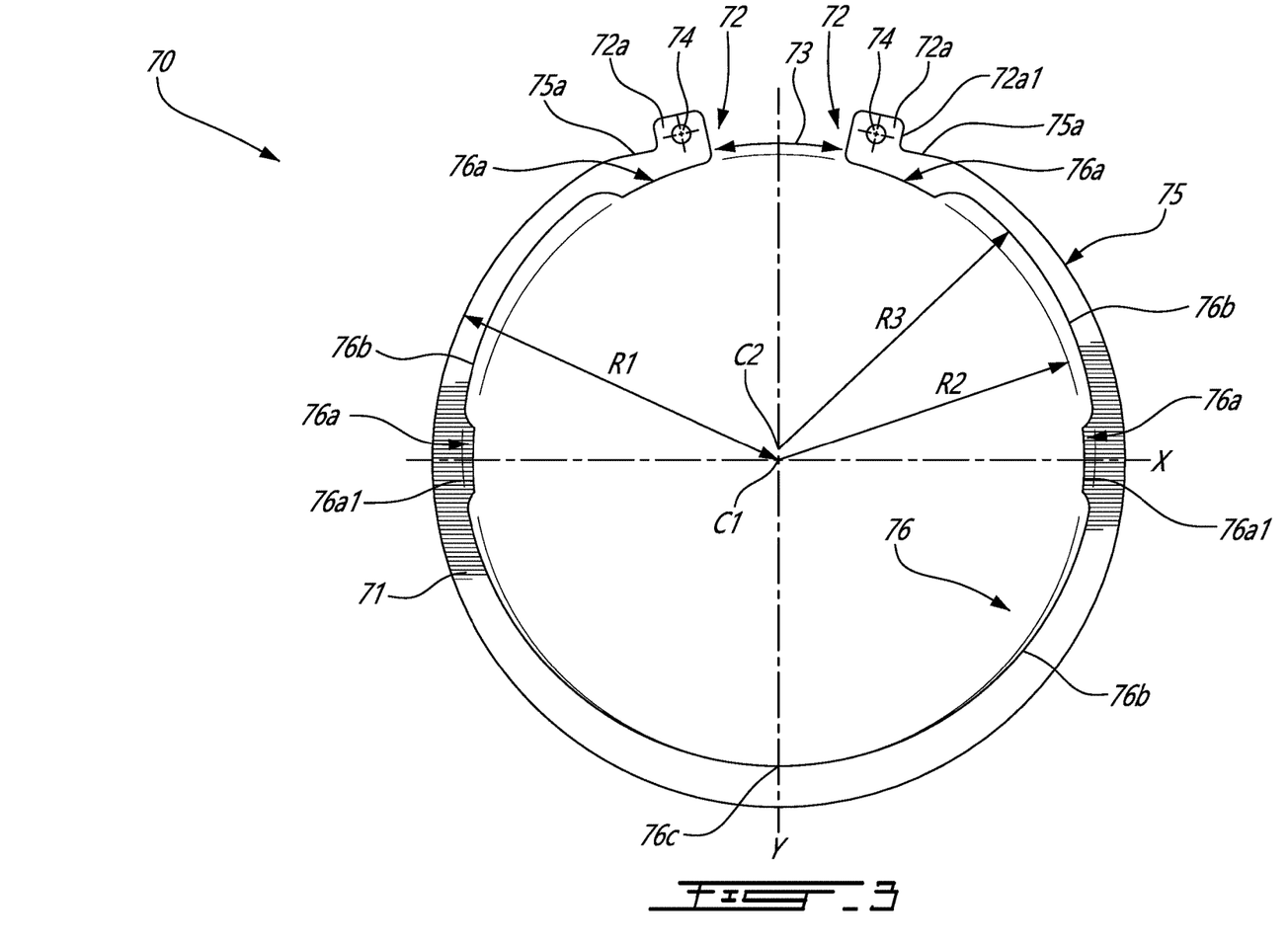
FIG. 3 is front schematic view of an internal retaining ring for the rotating assembly of FIG. 2.

Referring to FIG. 3, an internal retaining ring 70 according to an embodiment of the present disclosure for placement in the second groove 34 of the outer shaft 30 is shown. By 'internal', it is understood that the internal retaining ring 70 is placeable within the bore 31 of the outer shaft 30, in contrast to an 'external' retaining ring which is placeable around an external surface of a shaft or other such component. The illustrated internal retaining ring 70 includes a semi-annular body 71 having a pair of end portions 72 defining a circumferential gap 73 therebetween. The width of the circumferential gap 73 may vary, for instance based on the dimensions of the outer shaft 30 and inner shaft 40 and thus the required deformation needed to fit the internal retaining ring between the shafts 30, 40. In other cases, the pair of end portions 72 may circumferentially touch, leaving no gap therebetween. In the depicted embodiment, the end portions 72 include optional holes or lugs 74 to facilitate the installation of the internal retaining ring 70 in the second groove 34, as will be discussed in further detail below. The end portions 72 include radially outward protruding anti-rotation tabs 72a that are operable for engagement with corresponding anti-rotation features 36 of the outer shaft 30 to prevent rotation of the internal retaining ring once installed in the second groove 34, as will be discussed in further detail below. In the shown case, the radially outward protruding anti-rotation tabs 72a have square-shaped cross-sectional profile, although other profile shapes may be contemplated as well.

The depicted internal retaining ring 70 has an outer circumferential surface 75 and an inner circumferential surface 76. The outer circumferential surface 75 has a curvature defined about a first center of curvature C1. The first center of curvature C1 is located at the intersection of two orthogonal axes X, Y. In the depicted embodiment, for instance in cases where the outer shaft is collinear with the central axis 11, the two axes X, Y are orthogonal to the central axis 11 which passes through the first center of curvature C1. The outer circumferential surface 75 has a radius R1 with reference to the first center of curvature C1. In the depicted embodiment, although not necessarily the case in all embodiments, the outer circumferential surface 75 includes flat portions 75a as it approaches respective end portions 72. In other cases, the curvature of the outer circumferential surface 75 may be consistent along the entirety of the outer circumferential surface 75, i.e. with radius R1 with reference to the first center of curvature C1. While the internal retaining ring 70 in the shown case includes two radially outward protruding anti-rotation tabs 72a at the pair of end portions 72, other numbers and locations of radially outward protruding anti-rotation tabs 72a may be contemplated as well. For instance, the two radially outward protruding anti-rotation tabs 72a may be positioned proximate the pair of end portions 2 but circumferentially inward along the outer circumferential surface 75. In other cases, additional radially outward protruding anti-rotation tabs 72a may be positioned at other locations along the outer circumferential surface 75. In some cases, such additional radially outward protruding anti-rotation tabs 72a may replace one or both of the radially outward protruding anti-rotation tabs 72a at the pair of end portions 72.

The inner circumferential surface 76 includes radially inward protruding tabs 76a circumferentially spaced apart around the inner circumferential surface 76. Such radially inward protruding tabs 76a may also be referred to as internal axial retaining features, as will be discussed in further detail below, as they are operable for engagement with and axial retention of the retained feature 60. The radially inward protruding tabs 76a have radially inner surfaces 76a1 with curvatures defined about the first center of curvature C1 with a radius R2 that is less than the radius R1 of the outer circumferential surface 75. As such, the radially inner surfaces 76a1 are concentric with the outer circumferential surface 75, ensuring consistent axial retention for the retained feature 60. Due to this concentricity, once the internal retaining ring 70 is installed within the second groove 34, the radial height of the internal retaining ring 70 over the second groove's 34 edge will be constant, providing uniform axial retention for the retained feature 60. In the embodiment depicted in FIG. 3, the inner circumferential surface 76 includes four such radially inward protruding tabs 76a: two along the X axis, and two at the end portions 72. In the shown case, the radially inward protruding tabs 76a are symmetric about the Y axis. In other cases, other numbers and arrangements of radially inward protruding tabs 76a may be contemplated, as will be discussed in further detail below.

The inner circumferential surface 76 further includes recessed portions 76b between the radially inward protruding tabs 76a along the inner circumferential surface 76. The recessed portions 76b have curvatures defined about a second center of curvature C2 that is different than the first center of curvature C1. The curvature of the recessed portions 76b have a radius R3 that is less than the radius R1 of the outer circumferential surface 75 but greater than the radius R2 of the radially inner surfaces 76a1. In the depicted case, the second center of curvature C2 is vertically displaced along the Y axis relative to the first center of curvature C1. Stated otherwise, the first center of curvature C1 and the second center of curvature C2 are collinear about the Y axis which bisects the semi-annular body 71 between the pair of end portions 72. Other relative positions for the two centers of curvature C1, C2 may be contemplated as well. As such, the internal retention ring 70 has an overall "moon shape" (i.e. a radial cross section that varies along its circumference), which, as will be discussed in further detail below, facilitates its installation within the bore 31 of the outer shaft 30.

In the embodiment depicted in FIG. 3, the inner circumferential surface 76 includes three recessed portions 76b. In other cases, as will be discussed in further detail below, other numbers of recessed portions 76b may be contemplated as well. In the depicted case, due to the relative positioning of the two centers of curvature C1, C2, the radii R2 and R3 coincide at a lowermost portion 76c of the inner circumferential surface 76, illustratively along the Y axis in one of the recessed portions 76b. As such, this lowermost portion 76c, while being situated in a recessed portion 76b, acts as an additional internal axial retaining feature for axially retaining the retained feature 60. The overall radial thickness of the semi-annular body 71 varies along its circumference, for instance due to the radially inward protruding tabs 76a and the recessed portions 76b. Such varying thickness may, for instance, contribute to a lesser weight of the internal retaining ring 70 and facilitate its deformation upon installation in the rotating assembly 20, as will be discussed in further detail below.

Referring to FIGS. 2 and 3, the internal retaining ring 70 may be installed in the rotation assembly within the bore 31 of the outer shaft 30 subsequently to the assembly of the outer shaft 30 with the inner shaft 40. As such, the radial spacing between the outer shaft 30 and the inner shaft 40 may be limited vis-à-vis the installation of the internal retaining ring 70. In addition, in the embodiment shown in FIG. 2, the inner shaft 40 includes a raised shoulder portion 41 protruding radially outward where the inner shaft 40 meets the outer shaft 30, further contributing to such spatial constraints.

Figure 4:
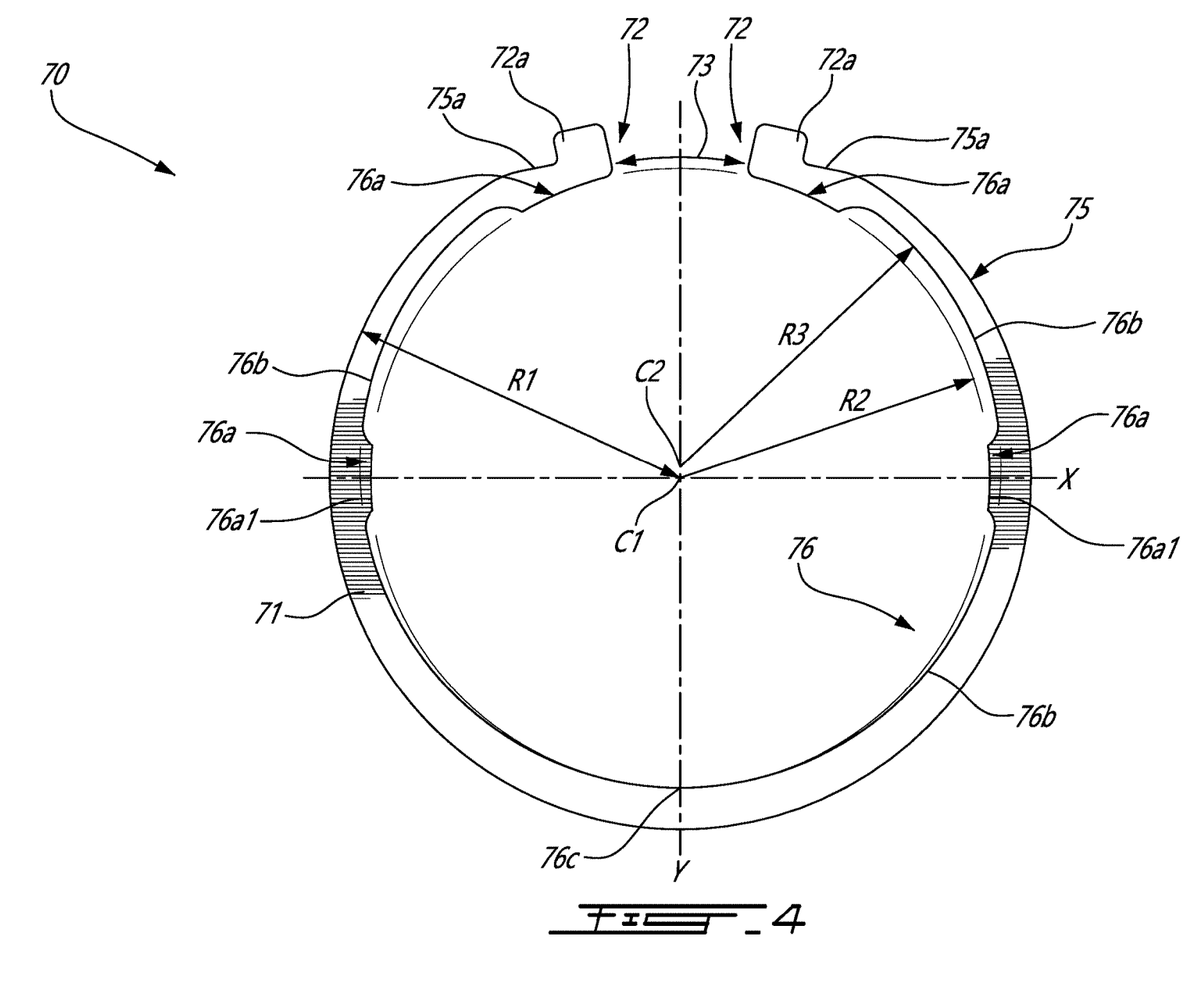
FIG. 4 is a front schematic view of another internal retaining ring for the rotating assembly of FIG. 2.

The above-described geometry of the internal retaining ring 70 may allow for its installation in such a constrained location, for instance due to its 'moon-shaped' geometry and its thinner radial thickness compared to traditional internal retaining rings due to lower spring-back force requirements, as discussed above. For instance, in an exemplary installation process, the internal retaining ring 70 is first placed or slipped over the inner shaft 40 from an opposite end (not shown) and positioned adjacent the second groove 34 with the end portions 72 positioned in the slot 35 between the outer shaft's 30 anti-rotation features 36. In other cases, the two end portions 72 may be pulled apart to elastically deform the internal retaining ring 70, for instance with pliers (not shown) inserted into the holes 74 to allow the internal retaining ring 70 to fit around the inner shaft 40. Then, the internal retaining ring 70 is elastically deformed by squeezing the two end portions 72 together to narrow the circumferential gap 73, for instance by inserting the tips of the pliers into respective holes 74. Such deforming of the internal retaining ring 70 may cause the semi-annular body 71 to change from its above-described 'moon-shaped' profile (due to the two centers of curvature C1, C2) to a more circular profile, allowing it to fit in the narrow radial space between the outer shaft 30 and inner shaft 40 and into the second groove 34. Referring to FIG. 4, in another embodiment, the end portions 72 may not include holes or lugs and the deforming of the internal retaining ring 70 may be done via alternate means, for instance manually with a user's fingers. Other deformation means may be contemplated as well. Deforming the internal retaining 70 may be easier than traditional retaining rings with high spring-back forces, as will be discussed in further detail below.

During installation of the internal retaining ring 70 within the second groove 34, the internal retaining ring 70 is aligned so that one of the radially-outward protruding anti-rotation tabs 72a engage with a respective anti-rotation feature 36 of the outer shaft 30. As shown in FIG. 2, a radially-outward protruding anti-rotation tab 72a engages or hooks onto a corresponding notch 36, preventing the internal retaining ring 70 from rotating within the second groove 34. In the shown case, the internal retaining ring 70 and second groove 34 are dimensioned so that only one radially-outward protruding anti-rotation tab 72a makes contact with a corresponding notch 36 at a time, while a slight gap is formed between the other radially-outward protruding anti-rotation tab 72a and its corresponding notch 36. This gap is minimized to a non-zero value to, for instance, ensure proper seating of the internal retaining ring 70 within the second groove 34, to minimize rotation of the internal retaining ring 70 and to dampen vibrations. Such rotation may produce undesirable effects such as scoring of the outer shaft 30. The slot 35 may be used in a final verification step to ensure the internal retaining ring 70 is properly installed. In the shown case, once assembled, an external mating surface 72a1 on each radially outward protruding anti-rotation tab 72a is operable to sit flush, i.e. flat and parallel against a mating surface 36a of a corresponding notch 36. Such flush engagement may maximize the surface area between these features, decreasing the likelihood that the internal retaining ring 70 will rotate or slip out of the groove 34. Other mating geometries for the radially outward protruding anti-rotation tabs 72a and notches 36 may be contemplated as well.

As discussed above, once installed in the second groove 34, the internal retaining ring 70 axially retains the retained feature 60 within the bore of the outer shaft 30. In the shown case, the retained feature 60 is positioned in the first groove 33 and abuts the internal retaining ring 70 in an axial direction. The internal retaining ring 70 thus prevents the retained feature 60 from exiting the bore 31 of the outer shaft 30 from the first axial end 32. In particular, the retained feature 60 abuts the radially inward protruding tabs 76a of the internal retaining ring 70, as well as the lowermost portion 76c due to the 'moon-shape' of the internal retaining ring 70. As discussed above, the concentricity between the outer circumferential surface 75 and the radially inner surfaces 76a1 of the radially inward protruding tabs 76a ensure consistent axial retention for the retained feature 60 along its circumference.

Compared to typically-used internal retaining rings or circlips, the internal retaining ring 70 does not need to rely on spring-back forces within the semi-annular body 71 to prevent rotation. In addition, once installed, the internal retaining ring 70 provides axial retention to the retained feature 60 via the radially inward protruding tabs 76a and the lowermost portion 76c. As the internal retaining ring 70 does not require high spring-back forces for sufficient anti-rotation, for instance to prevent scoring of the outer shaft 30, the exerted loads on the outer shaft 30 may be reduced compared to a standard internal retaining ring 70 that relies on spring-back forces. As such, high stress concentrations throughout the outer shaft 30, for instance in the second groove 34 and especially corner radii of slot 35, may be avoided, potentially extending the lifespan of the outer shaft 30. In addition, the reduced required stiffness of the internal retaining ring 70 may contribute to a lower overall weight for the internal retaining ring 70.

Figure 5:
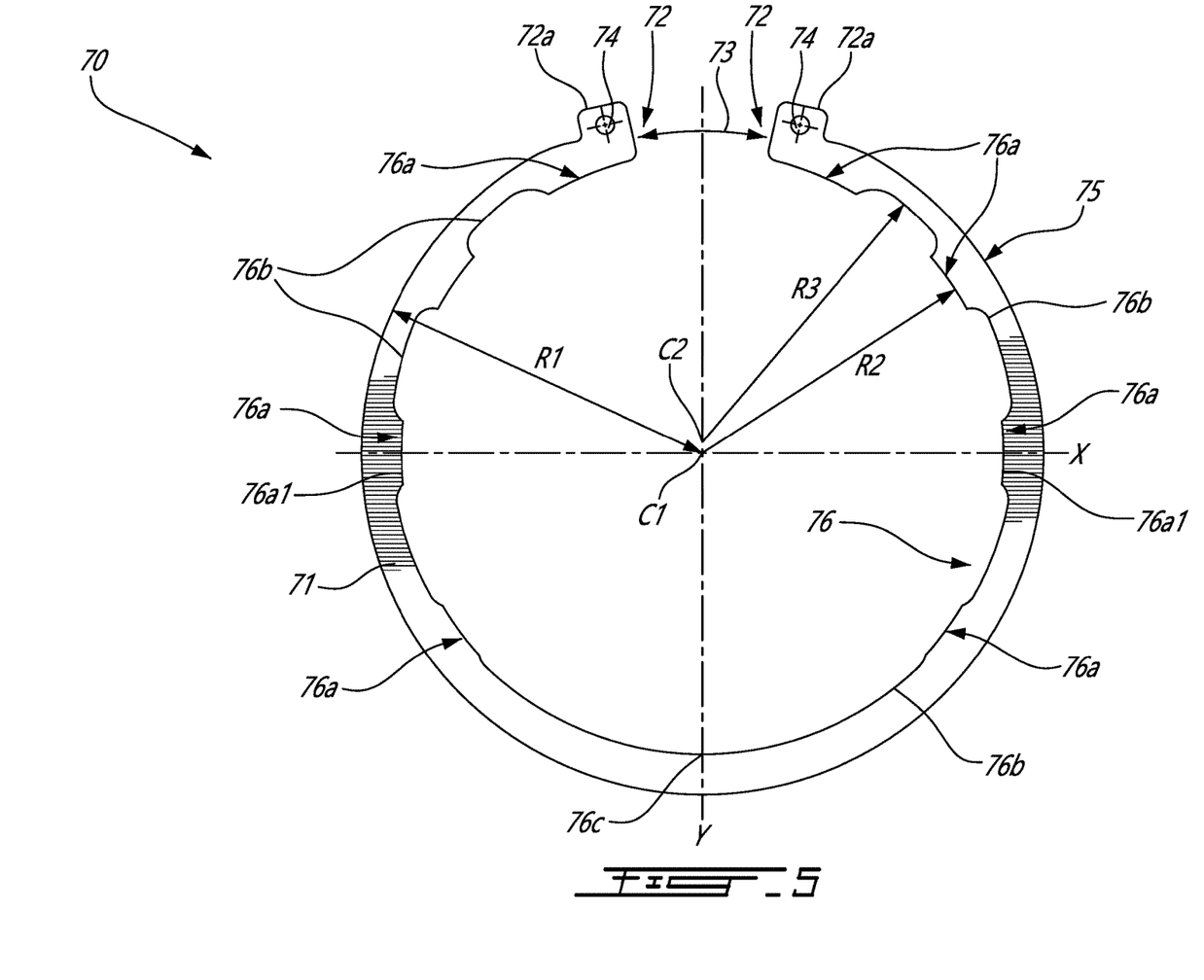
FIG. 5 is a front schematic view of another internal retaining ring for the rotating assembly of FIG. 2.

In various cases, the number of radially inward protruding tabs 76a along the inner circumferential surface 76 may vary. As discussed above, in the embodiment shown in FIGS. 3 and 4, the internal retaining ring 70 includes four such radially inward protruding tabs 76a. Referring to FIG. 5, in another embodiment, the internal retaining ring 70 may include a greater number of radially inward protruding tabs 76a, illustratively eight radially inward protruding tabs 76a. Other numbers of radially inward protruding tabs 76a may be contemplated as well. In the shown case, the positioning of the eight radially inward protruding tabs 76a is as follows: two at the end portions 72, two along the X axis, two along the inner circumferential surface 76 between the end portions 72 and the X axis, and two between the X axis and the lowermost portion 76c. As was the case with the other embodiments, due to the 'moon-shaped' profile of the semi-annular body 71 as a result of the two centers of curvature C1, C2, the lowermost portion 76c acts as an additional axial retention feature along with the radially inward protruding tabs 76a. In addition, while the radially inward protruding tabs 76a (and the lowermost portion 76c acting as an additional axial retention feature) in the shown cases are evenly distributed along the inner circumferential surface 76, other arrangements of radially inward protruding tabs 76a may be contemplated as well, for instance uneven distributions. In addition, in the shown case the radially inward protruding tabs 76a are positioned in a symmetric fashion about the Y axis, i.e. an axis bisecting the internal retaining ring 70 between the two end portions 72.

Figure 6:
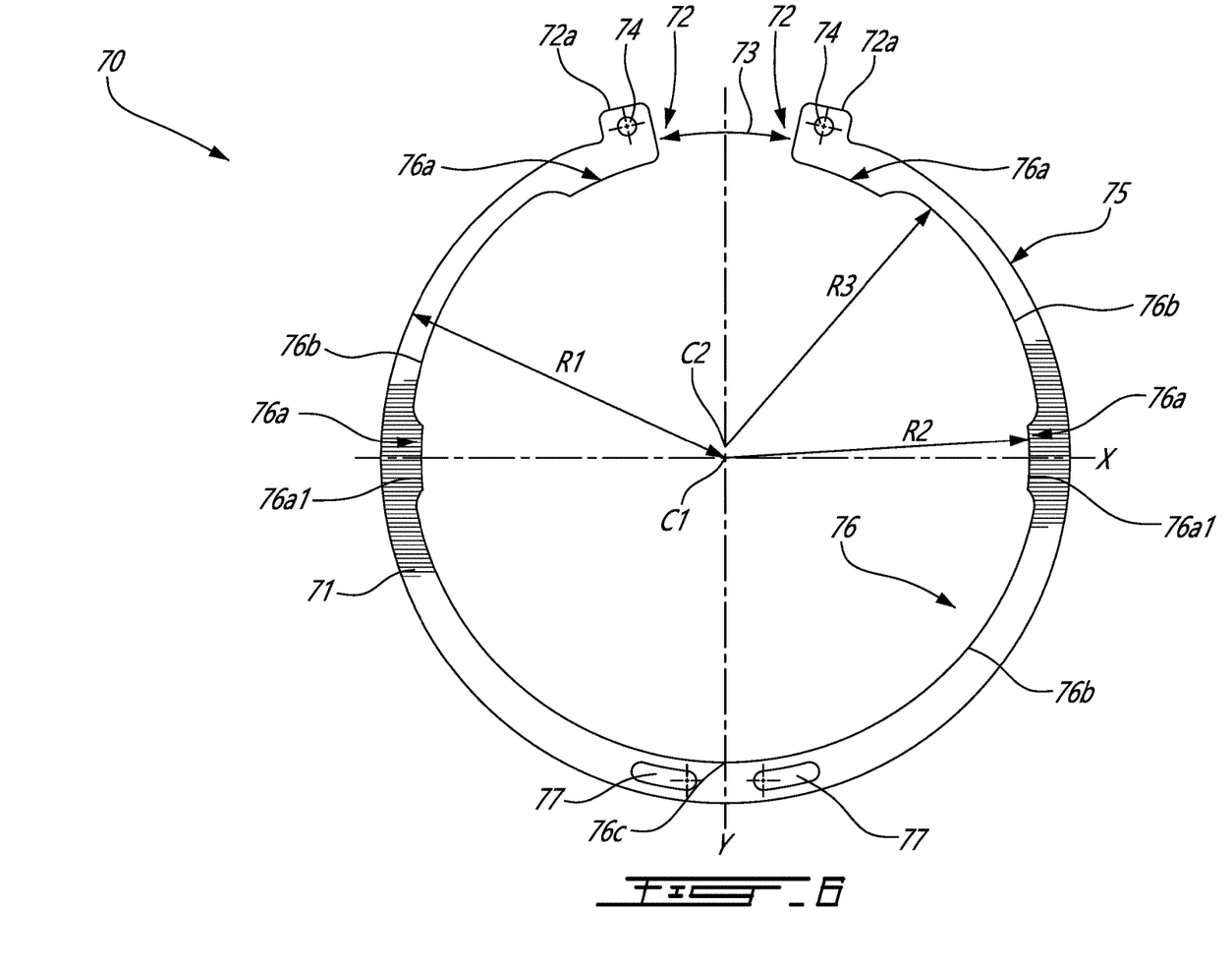
FIG. 6 is a front schematic view of another internal retaining ring for the rotating assembly of FIG. 2.

Referring to FIG. 6, in another embodiment, the internal retaining ring 70 may include various balancing features disposed in the semi-annular body 71. For instance, such balancing features may compensate for any uneven weight distribution along the circumference of the semi-annular body 71, for instance due to the end portions 72 or the radially inward protruding tabs 76a. Such balancing features may be openings or cutouts 77. In the shown case, two such openings or cutouts 77 are shown on the semi-annular body 71 on either side of the Y axis proximate the lowermost portion 76c. The number and position of such openings or cutouts 77 may vary, for instance based on specific balancing requirements. Such openings or cutouts 77 may additionally or alternatively contribute towards lowering the weight of the internal retaining ring 70. In the shown case, the cutouts 77 are shown to be slot-like cutouts. Other shapes for the cutouts 77 may be contemplated as well, for instance circular. Other balancing features may be contemplated as well.

The embodiments described in this document provide non-limiting examples of possible implementations of the present technology. Upon review of the present disclosure, a person of ordinary skill in the art will recognize that changes may be made to the embodiments described herein without departing from the scope of the present technology.

Yet further modifications could be implemented by a person of ordinary skill in the art in view of the present disclosure, which modifications would be within the scope of the present technology.

The invention claimed is:

1. An internal retaining ring for placement in a bore of an outer component of a rotating assembly, comprising:
    a semi-annular body;
    an outer circumferential surface of the semi-annular body, the outer circumferential surface having a curvature defined about a first center of curvature and radially outward protruding anti-rotation tabs operable for engagement with a corresponding anti-rotation feature of the outer component, the radially outward protruding anti-rotation tabs operable for flat and parallel engagement with the corresponding anti-rotation feature of the outer component; and
    an inner circumferential surface of the semi-annular body, the inner circumferential surface including radially inward protruding tabs circumferentially spaced apart around the inner circumferential surface, the radially inward protruding tabs having radially inner surfaces concentric with the outer circumferential surface, and recessed portions between the radially inward protruding tabs and having curvatures defined about a second center of curvature, the second center of curvature different from the first center of curvature.

2. The internal retaining ring as defined in claim 1, wherein the radially inward protruding tabs are symmetrically arranged about the inner circumferential surface about an axis bisecting the semi-annular body between a pair of end portions of the semi-annular body.

3. The internal retaining ring as defined in claim 1, wherein the semi-annular body includes a pair of end portions defining a circumferential gap therebetween.

4. The internal retaining ring as defined in claim 1, wherein the radially outward protruding anti-rotation tabs have a rectangular-shaped cross-sectional profile.

5. The internal retaining ring as defined in claim 1, wherein the radially outward protruding anti-rotation tabs are disposed at end portions of the semi-annular body.

6. The internal retaining ring as defined in claim 1, further comprising at least one balancing feature disposed in the semi-annular body.

7. The internal retaining ring as defined in claim 1, wherein the first center of curvature and the second center of curvature are collinear about an axis bisecting the semi-annular body between a pair of end portions of the semi-annular body.

8. A rotation assembly operable for rotation along a rotation axis of a gas turbine engine, comprising:
    an outer component having a bore, a groove proximate an axial end of the outer component, and an anti-rotation feature proximate the groove;
    an inner component rotatably engaged with the outer component;
    a sealing ring disposed within the bore of the outer component; and
    an internal retaining ring disposed in the groove and axially retaining the sealing ring, the internal retaining ring including:
    a semi-annular body;
    an outer circumferential surface of the semi-annular body, the outer circumferential surface having a curvature defined about a first center of curvature and radially outward protruding anti-rotation tabs operable for engagement with the anti-rotation feature; and an inner circumferential surface of the semi-annular body, the inner circumferential surface including radially inward protruding tabs circumferentially spaced apart around the inner circumferential surface, the radially inward protruding tabs having radially inner surfaces concentric with the outer circumferential surface, and recessed portions between the radially inward protruding tabs and having curvatures defined about a second center of curvature, the second center of curvature different from the first center of curvature, the radially inward protruding tabs axially retaining the sealing ring.

9. The rotation assembly as defined in claim 8, wherein the sealing ring is disposed in an additional groove in the bore of the outer component.

10. The rotating assembly as defined in claim 8, further comprising a slot at the axial end of the outer component, the slot extending axially inward towards the groove, wherein the anti-rotation feature in the outer component includes notches formed at respective edges of the slot proximate the groove.

11. The rotation assembly as defined in claim 10, wherein the radially outward protruding anti-rotation tabs of the internal retaining ring are operable for flat and parallel engagement with corresponding notches in the outer component.

12. The rotation assembly as defined in claim 8, wherein the outer component and the inner component are respective outer and inner shafts in a gearbox in the gas turbine engine.

13. The rotation assembly as defined in claim 8, wherein the radially inward protruding tabs are symmetrically arranged about the inner circumferential surface about an axis bisecting the semi-annular body between a pair of end portions of the semi-annular body of the internal retaining ring.

14. The rotation assembly as defined in claim 8, wherein the semi-annular body of the internal retaining ring includes a pair of end portions defining a circumferential gap therebetween.

15. The rotation assembly as defined in claim 8, wherein the radially outward protruding anti-rotation tabs have a rectangular-shaped cross-sectional profile.

16. The rotation assembly as defined in claim 8, wherein the radially outward protruding anti-rotation tabs are disposed at end portions of the semi-annular body of the internal retaining ring.

17. The rotation assembly as defined in claim 8, further comprising at least one balancing feature disposed in the semi-annular body of the internal retaining ring.

18. The rotation assembly as defined in claim 8, wherein the first center of curvature and the second center of curvature are collinear about an axis bisecting the semi-annular body between a pair of end portions of the semi-annular body of the internal retaining ring.

19. A rotation assembly operable for rotation along a rotation axis of a gas turbine engine, comprising:
an outer shaft of a gearbox, the outer shaft having a bore, a groove proximate an axial end of the outer shaft, and an anti-rotation feature proximate the groove;
an inner shaft of the gearbox rotatably engaged with the outer shaft;
a sealing ring disposed within the bore of the outer shaft; and
an internal retaining ring disposed in the groove and axially retaining the sealing ring, the internal retaining ring including:
a semi-annular body;
an outer circumferential surface of the semi-annular body, the outer circumferential surface having a curvature defined about a first center of curvature and radially outward protruding anti-rotation tabs operable for engagement with the anti-rotation feature; and
an inner circumferential surface of the semi-annular body, the inner circumferential surface including radially inward protruding tabs circumferentially spaced apart around the inner circumferential surface, the radially inward protruding tabs having radially inner surfaces concentric with the outer circumferential surface, and recessed portions between the radially inward protruding tabs and having curvatures defined about a second center of curvature, the second center of curvature different from the first center of curvature, the radially inward protruding tabs axially retaining the sealing ring.

20. A rotation assembly operable for rotation along a rotation axis of a gas turbine engine, comprising:
an outer component having a bore, a groove proximate an axial end of the outer component, an anti-rotation feature proximate the groove, and a slot at the axial end of the outer component, the slot extending axially inward towards the groove, wherein the anti-rotation feature includes notches formed at respective edges of the slot proximate the groove;
an inner component rotatably engaged with the outer component;
a retained feature disposed within the bore of the outer component; and
an internal retaining ring disposed in the groove and axially retaining the retained feature, the internal retaining ring including:
a semi-annular body;
an outer circumferential surface of the semi-annular body, the outer circumferential surface having a curvature defined about a first center of curvature and radially outward protruding anti-rotation tabs operable for engagement with the anti-rotation feature; and
an inner circumferential surface of the semi-annular body, the inner circumferential surface including radially inward protruding tabs circumferentially spaced apart around the inner circumferential surface, the radially inward protruding tabs having radially inner surfaces concentric with the outer circumferential surface, and recessed portions between the radially inward protruding tabs and having curvatures defined about a second center of curvature, the second center of curvature different from the first center of curvature, the radially inward protruding tabs axially retaining the retained feature.

* * * * *